US006850864B2

(12) United States Patent
Gillard et al.

(10) Patent No.: US 6,850,864 B2
(45) Date of Patent: Feb. 1, 2005

(54) METHOD FOR ANALYZING DIP IN SEISMIC DATA VOLUMES

(75) Inventors: Dominique Gillard, Houston, TX (US); Brian P. West, Houston, TX (US); Steven R. May, Missouri City, TX (US); John E. Eastwood, Bellaire, TX (US); Michael D. Gross, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/178,607

(22) Filed: Jun. 24, 2002

(65) Prior Publication Data

US 2003/0055598 A1 Mar. 20, 2003

Related U.S. Application Data

(60) Provisional application No. 60/302,576, filed on Jun. 29, 2001.

(51) Int. Cl.[7] .............................................. G06F 15/00
(52) U.S. Cl. ..................................................... 702/156
(58) Field of Search .......................... 702/156, 14, 16, 702/18, 17, 6; 367/72, 68, 40, 73, 43; 359/451; 175/50; 345/419; 340/855, 15.5; 364/421, 422, 323, 331; 354/420; 73/152; 348/365; 703/10, 2; 324/339

(56) References Cited

U.S. PATENT DOCUMENTS

| 4,357,660 | A | * | 11/1982 | Hepp | ............................ | 702/10 |
| 4,800,539 | A | * | 1/1989 | Corn et al. | ..................... | 367/72 |
| 5,530,679 | A | | 6/1996 | Albertin | ....................... | 367/68 |
| 5,966,672 | A | * | 10/1999 | Knupp | ......................... | 702/16 |
| 6,092,025 | A | | 7/2000 | Neff | .............................. | 702/10 |
| 6,226,595 | B1 | * | 5/2001 | Rossi et al. | .................... | 702/10 |
| 6,490,528 | B2 | * | 12/2002 | Cheng et al. | .................. | 702/14 |
| RE38,229 | E | * | 8/2003 | Marfurt et al. | ................ | 702/16 |
| 2001/0047245 | A1 | * | 11/2001 | Cheng et al. | .................. | 702/14 |

FOREIGN PATENT DOCUMENTS

| WO | WO 97/13166 | 10/1997 | ............. | G01V/1/30 |
| WO | WO 00/16125 | 3/2000 | ............. | G01V/1/28 |

OTHER PUBLICATIONS

Maatschappij, B. V., 1988, "Horizon Processing Techniques for Recognition of Structural Geology on 3D Seismic". Research Disclosure No. 29473, Oct. 10, 1988, p. 792.

Randen, T., Monsen, E., Signer, C., Abrahamsen, A., Hansen, J., Saeter, T., Schlaf, J., and Sonneland, L., Aug. 6–11, 2000, "Three Dimensional Texture Attributes for Seismic Data Analysis", 70th Annual SEG Int. Mtg., Calgary, Canada, Expanded Abstr. Biogr., vol. 1, pp. 668–671.

Meldahl, P., Heggland, R., de Groot, P.FM., and Bril, and A.H., Oct. 31–Nov. 5, 1999, "The Chimney Cube, an Example of Semi–Automated Detection of Seismic Objects by Directive Attributes and Neural Networks: Part I; Methodology" and "The Chimney Cube, and Example of Semi-Automated Detection of Seismic Objects by Directive Attributes and Neural Networks: Part II; Interpretation", 69th Annual SEG Int. Mtg, Houston, Expanded Abstr. Biogr. vol. 1, pp. 931–934.

(List continued on next page.)

Primary Examiner—John Barlow
Assistant Examiner—Tung S Lau
(74) Attorney, Agent, or Firm—J. Paul Plummer

(57) ABSTRACT

A method of analyzing dip in a seismic data volume in which a horizontal gradient is calculated in a first direction in the seismic data volume. A vertical gradient is calculated at data locations in the seismic data volume corresponding to the locations at which the horizontal gradient was calculated. Dip is calculated in the first direction from the horizontal gradient in the first direction and the vertical gradient. Repetition of the process for the entire seismic data volume results in a dip volume.

18 Claims, 2 Drawing Sheets

OTHER PUBLICATIONS

Marfurt, K. J. and Kirlin, R. L., Jan.–Feb. 2000, "3–D Broad–Band Estimates of Reflector Dip and Amplitude", Geophysics, vol. 65, No. 1, pp. 304–320.

Marfurt, Gersztenkorn, Nissen, Sudhaker and Crawford, Jan.–Feb. 1999, "Coherency Calculations in the Presence of Structural Dip", Geophysics, vol. 64, No. 1, pp. 104–111.

Alekseev, A.S. and Burmakov, Y.A., 1980, "Determination of Spatial Parameters of Reflecting Surfaces in the Three–Dimensional Seismics", Dokl Akad Nauk SSSR, vol. 253, No. 6, pp. 1339–1342.

* cited by examiner

METHOD FOR ANALYZING DIP IN SEISMIC DATA VOLUMES

This application claims the benefit of U.S. Provisional Application No. 60/302,576 filed on Jun. 29, 2001.

FIELD OF THE INVENTION

This invention relates generally to the field of seismic data processing. Specifically, the invention is a method for analyzing dip in seismic data volumes.

BACKGROUND OF THE INVENTION

In many geologic basins the detailed identification and characterization of faults, folds, and other structural or geometric characteristics can be extremely useful in basin and reservoir characterization analysis. The size scale of these analyses range from identification of regional dip-domains on a scale of 1's to 100's of kilometers to the dip of individual reflectors on the scale of 10's to 100's of meters. Regional dip is useful in the analysis of hydrocarbon migration and systems analysis, while individual reflector dip is useful for the purposes of fault-seal or dip-steering applications. All size scales benefit from a quantitative characterization across the entire volume of seismic data.

There are two main approaches for obtaining dip information from seismic data. The first approach is manual seismic geometry mapping. Manual delineation of seismic geometries in seismic data can be a time consuming, subjective, and difficult process. This approach is burdened with associated costs and trade-offs in cycle-time, potential subjectivity, and density of observations. The second approach is the use of dip and azimuth calculations based on cross-correlations. However, techniques based on cross-correlation algorithms are prone to noise, limited in resolution, and computationally expensive. As a result, trade-offs in quality and scalability limitations must be made.

Several techniques have been used in the oil industry to automate and further quantify the production of seismic dip information. D. B. Neff, in U.S. Pat. No. 6,092,025 entitled "Hydrocarbon Edge Detection Using Seismic Amplitude" and issued Jul. 18, 2000, describes a cross-correlation based technique for the production of strike and dip volumes. The technique finds points corresponding to the maximum cross-correlations in a 3×3 moving sub-volume of traces, and calculates a best fit plane to these points to obtain the strike and dip of this plane. The limitations of this technique include the reliance on a cross-correlation/plane-fitting algorithm that is computationally expensive and potentially noise prone.

Research Disclosure Serial No. 294073 published on Oct. 10, 1988, entitled "Horizon Processing Techniques for Recognition of Structural Geology on 3D Seismic" describes a method in which the gradient dT/dx (i.e. the dip) of a pre-existing horizon is analyzed for the identification of faults, flexures, or other structural and stratigraphic features. However, the method requires a pre-existing horizon and does not generate three-dimensional volumes of strike and dip measures.

Randen, T., Monsen, E., Signer, C., Abrahamsen, A., Hansen, J., Saeter, T., Schlaf, J., and Sonneland, L. present a method for dip-steered seismic facies analysis in "Three-Dimensional Texture Attributes for Seismic Data Analysis", 70$^{th}$ Annual SEG Int. Mtg, Calgary, Canada, Aug. 6–11, 2000, Expanded Abstr. Biogr., Vol. 1, pp 668–671. The method produces dip and azimuth cubes using a fully 3D gradient estimation approach which, combined with a principal component analysis, produces the dip and azimuth estimates. This approach is computationally intensive and also suffers from potentially reduced resolution in the estimates.

Meldahl, P., Heggland, R., de Groot, P. F. M., and Bril, A. H., have two relevant publications, "The Chimney Cube, an Example of Semi-Automated Detection of Seismic Objects by Directive Attributes and Neural Networks: Part I; Methodology", and "The Chimney Cube, an Example of Semi-Automated Detection of Seismic Objects by Directive Attributes and Neural Networks: Part II; Interpretation" in 69$^{th}$ Annual SEG Int. Mtg, Houston, Oct. 31–Nov. 5, 1999, Expanded Abstr. Biogr. Vol. 1, pp. 931–934, Pap No. SINT2 3, and a patent application, GB 9819910.0 "Method of Seismic Body Recognition", all of which involve dip-steered textural attributes consistent with the cross-correlation and full 3D-gradient based methods outlined above.

Dip-steering applications are an important supporting technology to many other interpretative techniques. The stratigraphic framework of any particular geologic setting is an important aspect that is always considered, albeit unconsciously, by seismic facies interpreters. Seismic facies interpreters, for example, do not consider continuity solely in the time plane. Rather, they judge continuity following the stratigraphic layering defined by dip of seismic reflectors.

Dip steering is particularly important to discontinuity related calculations. For example, Marfurt, K. J. and Kirlin, R. L, "3-D Broad-Band Estimates of Reflector Dip and Amplitude", Geophysics, Vol. 65, No. 1, pp 304–320, Jan–Feb, 2000, and Bahorich, Farmer, Kirlin, and Marfurt, "Identifying structural and stratigraphic features in three dimensions—such that seismic signal processing and exploration give improved resolution, computational speed and estimates of dip even with coherent noise," patent WO 9713166, describe a cross-correlation-based technique for discontinuity estimates that first applies a pre-defined dip azimuth measurement axis to remove a significant portion of the regional structural dip. They then apply a semblance calculation as a function of time to multiple seismic traces to further estimate and correct for local dip. During this step, they also create a maximum semblance cube that highlights stratigraphic and structural discontinuities, corrected for structural dips. The main objectives of these methods and techniques are the production of cross-correlation, semblance, or discontinuity measures. However, a by-product is a dip and azimuth cube. The main disadvantage of their correlation/eigenvalue-based method to produce dip and azimuth cubes is that it is very computationally intensive.

Similarly, Marfurt, Gersztenkorn, Nissen, Sudhaker, and Crawford, Geophysics, Vol. 64, No. 1, pp 104–111, January–February 1999, "Coherency Calculations in the Presence of Structural Dip," examine the similarity of multiple traces at various time lags to estimate the dip of reflectors. An eigenstructure algorithm is then used to calculate the similarity of traces in the locally averaged dip direction. The main disadvantage of this approach is the reliance on cross-correlation calculations, which are computationally expensive.

The abstract published by Alekseev, A. S., and Burmakov, Y. A., "Determination of Spatial Parameters of Reflecting Surfaces in the Three-Dimensional Seismics" Dokl Akad Nauk SSSR, Vol. 253, No. 6, pp 1339–1342, 1980, describes a method for dip and curvature characterization of seismic reflectors in 3D seismic data. However, this method is also cross-correlation based.

Thus, there is a need to generate, in a computationally efficient manner, a process that enables the rapid, quantitative characterization of seismic data so that it can be exploited in the geologic mapping/reservoir characterization process. Computational efficiency dictates that the process depend neither upon the picking of horizons, either manually by interpreters or automatically by computers, nor upon the calculation of cross correlations.

SUMMARY OF THE INVENTION

The invention is a method for analyzing dip in seismic data volumes. First, a three-dimensional volume of seismic data samples containing data values at data locations is selected. A first direction is selected in the seismic data volume. A horizontal gradient is calculated in the first direction at a plurality of the data locations in the seismic data volume from the difference in data values at data locations horizontally separated in the first direction. A vertical gradient is calculated at the plurality of data locations in the seismic data volume from the difference in data values at vertically separated data locations. An apparent dip is calculated in the first direction at the plurality of data locations from the horizontal gradient in the first direction calculated at the corresponding data location and the vertical gradient calculated at the corresponding data location. Repetition of this process throughout the first direction throughout the seismic data volume results in a dip volume for the first direction. The process may be repeated for other directions in the seismic data volume to compute dip volumes for each such other direction.

BRIEF DESCRIPTION OF THE DRAWINGS

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the scope of the invention, as defined by the appended claims.

DETAILED DESCRIPTION OF THE INVENTION

The invention is a method for analyzing dip in a volume of seismic data. Specifically, the invention is a method for the characterization of dips and azimuths of seismic reflectors within a volume of data for the quantitative estimation of structural and stratigraphic properties. The invention assists in the visualization, characterization, and automation of the mapping of features in seismic data. This invention improves the ability of geoscience interpreters to recognize and map seismic geometries and structural and dip domains in seismic attribute or seismic amplitude data, as part of the hydrocarbon exploration and production work process.

The invention takes a seismic data volume as input and can be used to generate either apparent dip volumes or true dip and azimuth volumes as output. The method of the invention is different from prior methods in that a gradient-based approach is used to calculate two orthogonal apparent dips. These apparent dips are assembled to produce true dip and azimuth volumes. The approach is more computationally efficient than approaches using cross-correlation calculations. In particular, the method of the invention uses a more computationally efficient method for calculating horizontal and vertical gradients than previous methods. In addition, the method offers the efficiency advantage of not requiring pre-picked horizons.

Figure 1:
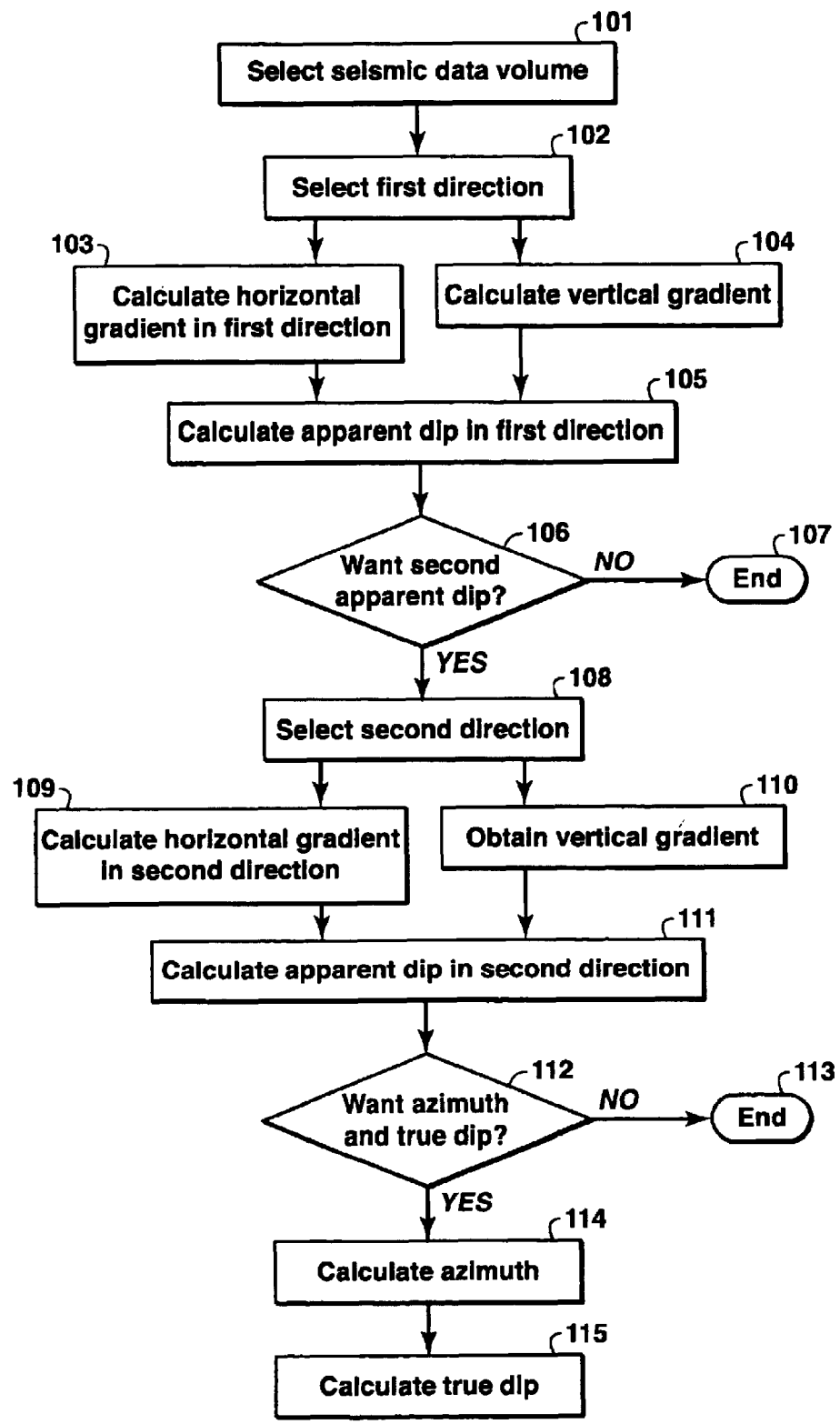
FIG. 1 is a flowchart illustrating the steps of an embodiment of the method of the invention for analyzing dip in seismic data volumes.

FIG. 1 is a flowchart illustrating the processing steps for one embodiment of the method of the invention for analyzing dip in seismic data volumes. First, in step 101, a three-dimensional volume of seismic data samples is selected. Preferably, the volume contains a plurality of seismic data samples. Each seismic data sample is represented by a data location and a seismic data value. The seismic data is preferably seismic amplitude or seismic attribute data. The seismic data includes, but is not limited to, time- or depth-migrated seismic data such as near, far, and full stack seismic amplitude data.

The quality of the resulting output volumes is dependent upon the quality of the input seismic data. Where data artifacts or noise are present in the seismic data, the method may produce noisy results. For example, random noise in the seismic section may produce noisy results. In regions of coherent noise, on the other hand, the method will estimate the dip of reflectors. However, due to imaging problems resulting from the coherent noise, this estimate of the dip may not have a reasonable geologic explanation.

Next, in step 102, a first direction is selected in the seismic data volume from step 101. The first direction is preferably selected to be substantially horizontal and will be the direction in which a first apparent dip will be calculated. Thus, the first direction is preferably selected to be in the primary direction of interest for analyzing dip in the seismic data. For example, this could be the direction of maximum dip for the dominant dipping structures in the seismic data volume.

At step 103, a horizontal gradient dx is calculated in the first direction at a plurality of data locations in the seismic data volume from step 101. In the preferred embodiment, the horizontal gradient dx is calculated at every data location in the seismic data volume, but the invention is not so limited and any appropriate subset of data locations can be used. The horizontal gradient dx is calculated as the difference between the seismic data values of data locations horizontally separated in the first direction. This data value-based gradient calculation is described in detail in the discussion of FIG. 2 below.

At step 104, a vertical gradient dz is calculated at the plurality of data locations in the seismic data volume from step 103. The vertical gradient dz is preferably calculated as the difference between the seismic data values of vertically separated data locations. This data value-based gradient calculation is described in detail in the discussion of FIG. 2 below.

At step 105, an apparent dip $\theta_x$ is calculated in the first direction at the plurality of data locations from the horizontal gradient dx in the first direction calculated in step 103 and the vertical gradient dz in the first direction calculated in step 104. These apparent dip calculations generate a first direction apparent dip volume. The apparent dip $\theta_x$ in the first direction is preferably calculated using the equation $$\theta_x = \tan^{-1}\left(\frac{dz}{dx}\right). \tag{1}$$

The horizontal gradient dx in the first direction and the vertical gradient dz in Equation (1) are preferably calculated using Equations (11) and (13), respectively, which are described in detail in the discussion of FIG. 2, below.

At step 106, it is determined if a second apparent dip in a different direction is desired. If both the dip in the seismic data volume were uniform in one direction and the dip direction were known, then the dip direction could be selected as the first direction in step 102. In such a case the apparent dip $\theta_x$ in the first direction, calculated at step 105, would be the true dip and contain all the dip information available from the seismic data volume. Thus, a second apparent dip in another direction would be zero and unnecessary to calculate. Unfortunately, this will not always be the case. So, if the answer in step 106 is no, then the process ends at step 107. If, conversely, the answer in step 106 is yes, then the process continues on to step 108.

At step 108, a second direction is selected in the seismic data volume from step 101. The second direction is selected to be substantially horizontal. Since the seismic traces that contain the seismic data samples are usually situated in the vertical direction, the first and second directions are typically chosen to be substantially horizontal or parallel to the trend of the main formations in the seismic data. In a preferred embodiment, the second direction is selected to be substantially orthogonal to the first direction selected in step 102. In a further preferred embodiment, the first and second directions are selected to be the cross-line and in-line directions, respectively, of the seismic survey used to collect the seismic data. Then the first and second directions can be identified with the horizontal x and y directions of a Cartesian coordinate system describing the seismic data locations. In addition, the gradient and apparent dip calculations will then involve data locations on their closest spacing and thus with the highest resolution. The vertical direction will be identified with the z direction of this Cartesian coordinate system. In an alternative embodiment, the first and second directions are the horizontal x and y directions, respectively, of any Cartesian coordinate system in which the seismic data locations are described, which may differ from the in-line and cross-line directions described above.

At step 109, a horizontal gradient dy is calculated in the second direction at the plurality of data locations in the seismic data volume from step 103. The horizontal gradient dy is preferably calculated as the difference between the seismic data values of data locations horizontally separated in the second direction. This data value-based gradient calculation is described in detail in the discussion of FIG. 2 below.

At step 110, a vertical gradient dz is obtained at the plurality of data locations in the seismic data volume from step 103. In one embodiment, the values for the vertical gradient dz already calculated above in step 104 were saved and are used again here, because as will be understood to one skilled in the art only one vertical gradient calculation is necessary to fully characterize vertical variation in the seismic data volume. In another embodiment, the values for the vertical gradient dz calculated in step 104 were not saved and the vertical gradient dz is calculated again as the difference between the seismic data values of vertically separated data locations. This data value-based gradient calculation is described in detail in the discussion of FIG. 2 below.

At step 111, an apparent dip $\theta_y$ is calculated in the second direction at the plurality of data locations in the seismic data volume from the horizontal gradient dy in the second direction calculated in step 109 and the vertical gradient dz obtained in step 110. These apparent dip calculations generate a second direction apparent dip. The apparent dip $\theta_y$ in the second direction is preferably calculated using the equation $$\theta_y = \tan^{-1}\left(\frac{dz}{dx}\right). \tag{2}$$

The horizontal gradient dy in the second direction and the vertical gradient dz in Equation (2) are preferably calculated using Equations (12) and (13), respectively, which are described in detail in the discussion of FIG. 2, below.

The calculations of apparent dip in Equations (1) and (2) represent the local time-dip of the reflectors. The ratios dz/dx and dz/dy in Equations (1) and (2), respectively, have units of time per common depth point (cdp) number, and are referred to in the art as time-dip. However, for convenience, these units can be ignored and the apparent dips can be expressed in terms of "pseudo-degrees" relative to a horizontal time-slice or cross section. Note that if the data have been depth converted, units of length will be applicable.

The result of the process of FIG. 1, steps 101 through 111, is the creation of two dip volumes that characterize dip in the underlying seismic data volume. Optionally, but preferably, a median filter can be applied to remove any noise in the first and second direction apparent dip volumes. A 9×9 median filter is preferably used. Alternatively, the median filter could be set to a size appropriate to the scale of the dipping structures of interest. Any such filter, if applied, should be applied to the apparent dip volumes corresponding to each direction prior to making the decision of step 112.

Next, the two apparent dip volumes are preferably combined into true dip and azimuth volumes for the seismic data volume on a point-for-point calculation. At step 112, it is determined if azimuth and true dip volumes are desired. If the first direction, selected in step 102, were the true dip direction throughout the seismic data volume, then the apparent dip $\theta_x$ in the first direction, calculated at step 105, would be equivalent to the true dip in the seismic data volume. Similarly, if the second direction, selected in step 108, were the true dip direction throughout the seismic data volume, then the apparent dip $\theta_y$ in the second direction, calculated at step 111, would be the true dip in the seismic data volume. In either case, further calculations for a true dip would not be necessary. Such would be the case if the analyst has access to other data from which it can be determined that these directions defined true dip. Unfortunately, this will not always be the case. So, if the answer in step 112 is no, then the process ends at step 113. If, conversely, the answer in step 112 is yes, then the process continues to step 114.

At step 114, an azimuth is calculated at the plurality of data locations in the seismic data volume from the apparent dip in the first direction calculated in step 105 and the apparent dip in the second direction calculated in step 111. These azimuth calculations generate an azimuth volume. Let the azimuth $\beta_x$ relative to the first direction be defined as the angle between the strike of the reflector and the first direction. In a preferred embodiment, the first and second directions are selected in steps 102 and 108, respectively, to be substantially orthogonal. Then the azimuth $\beta_x$ relative to the first direction is preferably calculated using the equation $$\beta_x = \tan^{-1}\left(\frac{\tan(\theta_x)}{\tan(\theta_y)}\right). \quad (3)$$

If the azimuth $\beta_y$ relative to the second direction is defined as the angle between the strike of the reflector and the second direction, then the azimuth $\beta_y$ relative to the second direction is preferably calculated using the equation $$\beta_y = \tan^{-1}\left(\frac{\tan(\theta_y)}{\tan(\theta_x)}\right). \quad (4)$$

The apparent dips $\theta_x$ and $\theta_y$ in the first and second directions in Equations (3) and (4) are preferably calculated using Equations (1) and (2), respectively.

In an alternative embodiment, the first and second directions are not orthogonal. If $\phi$ represents the angle between the first and second directions, and is not equal to 90°, then the azimuth $\beta_x$ relative to the first direction is given by the following equation $$\beta_x = \cot^{-1}\left(\frac{\tan(\theta_y)}{\tan(\theta_x)\sin(\phi)} - \cot(\phi)\right), \quad (5)$$

and the azimuth $\beta_y$ relative to the second direction is given by the following equation $$\beta_y = \cot^{-1}\left(\frac{\tan(\theta_x)}{\tan(\theta_y)\sin(\phi)} - \cot(\phi)\right). \quad (6)$$

Note that for the orthogonal case, where $\phi=90°$, then Equations (5) and (6) revert to Equations (3) and (4), respectively.

Finally, at step 115, a true dip is calculated at the plurality of data locations in the seismic data volume. These true dip calculations generate a true dip volume. In one embodiment, the true dip is calculated from the apparent dip in the second direction calculated in step 111 and the azimuth relative to the first direction calculated in step 114. Here, the true dip is preferably calculated using the equation $$\text{true dip} = \tan^{-1}\left(\frac{\tan(\theta_y)}{\sin(\beta_x)}\right). \quad (7)$$

In another embodiment, the true dip is calculated from the apparent dip in the first direction calculated in step 105 and the azimuth relative to the second direction calculated in step 114. Here, the true dip is preferably calculated using the equation $$\text{true dip} = \tan^{-1}\left(\frac{\tan(\theta_x)}{\sin(\beta_y)}\right). \quad (8)$$

The apparent dips $\theta_x$ and $\theta_y$ in the first and second directions and the azimuths $\beta_x$ and $\beta_y$ relative to the first and second directions in Equations (7) and (8) are preferably calculated using Equations (1), (2), (5), and (6), respectively.

In the preferred embodiment in which the first and second directions are selected to be substantially orthogonal, the true dip may also be calculated using one of the following equivalent equations $$\text{true dip} = \tan^{-1}\left(\frac{\tan(\theta_x)}{\cos(\beta_x)}\right). \quad (9)$$

or $$\text{true dip} = \tan^{-1}\left(\frac{\tan(\theta_y)}{\cos(\beta_y)}\right). \quad (10)$$

The apparent dips $\theta_x$ and $\theta_y$ in the first and second directions and the azimuths $\beta_x$ and $\beta_y$ relative to the first and second directions in Equations (9) and (10) are preferably calculated using Equations (1), (2), (3), and (4), respectively.

If the method of the invention is applied to seismic data volumes that have not been depth-converted, then the resulting dip is a representation of the time-dip of the seismic reflectors. Use of this method on depth-converted seismic volumes would result in a more accurate representation of the true dip of the seismic reflectors.

Figure 2:
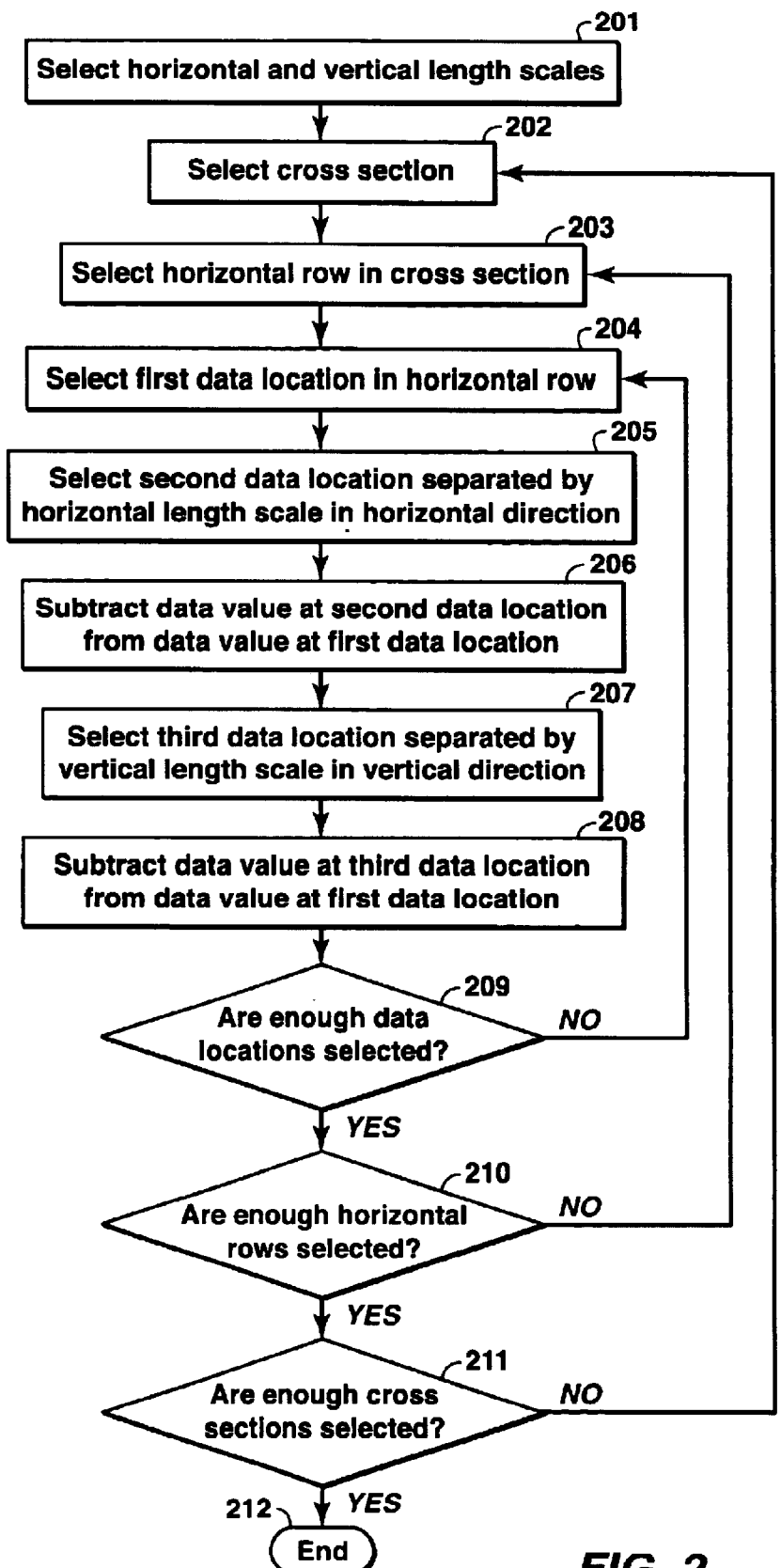
FIG. 2 is a flowchart illustrating the steps of an embodiment of the method of the invention for calculating horizontal and vertical gradients in a seismic data volume.

FIG. 2 is a flowchart illustrating the processing steps of an embodiment of the method of the invention for calculating horizontal and vertical gradients in a seismic data volume. The horizontal gradient is calculated in a selected horizontal direction, for example, the first and second directions selected above in steps 102 and 108, respectively, of FIG. 1. Thus, FIG. 2 describes the preferred method for the calculations in steps 103 and 104 of FIG. 1 of the horizontal gradient in the first direction and the corresponding vertical gradient, respectively, as well as the calculations in steps 109 and 110 of FIG. 1 of the horizontal gradient in the second direction and the corresponding vertical gradient, respectively.

Let S(x,y,z) represent the volume of seismic data samples. The variables (x,y,z) represent the data locations in a Cartesian coordinate system where x and y are horizontal and z is vertical. The volume of seismic data is typically collected, stored, and processed as a rectangular grid aligned with the orthogonal axes of the coordinates (x,y,z). As will be understood to one skilled in the art, the seismic data volume can be represented by an orthogonal grid of pixel or voxel values $S_{I,j,k}$. The index I represents a position in the horizontal direction corresponding to x, j represents a position in a mutually orthogonal horizontal direction corresponding to y, and k represents a position in a mutually orthogonal vertical direction corresponding to z. For example, the I or x direction may correspond to the first direction selected in step 102 of FIG. 1. The y or j direction will then correspond to the second direction selected in step 108 of FIG. 1.

First, at step 201, a horizontal length scale and a vertical length scale are selected. The horizontal and vertical length scales define the horizontal and vertical gradient calculations, respectively, in FIG. 1. The horizontally or vertically separated data locations in the gradient calculations of steps 103, 104, 109, and 110 of FIG. 1 are separated by a distance equal to the corresponding length scale. Thus, there can up to be three different length scales, one each for the first and second horizontal directions selected in steps 102 and 108, respectively, of FIG. 1 and one for the vertical direction, steps 104 and 110. Since the gradient operator will make calculations based on data values at pixel locations, the length scales should be equivalent to an integer number of pixel widths in the corresponding direction. In a preferred embodiment, the length scale is 1, corresponding to the width of 1 pixel, in every direction. This gives the highest resolution to the difference operators in the gradient calculations. In an alternative embodiment, a length scale can be selected to match a scale of interest for analyzing dip in the corresponding direction.

At step 202, a two-dimensional array in the three-dimensional seismic data volume is selected. In a preferred embodiment, the two-dimensional array is a vertical cross section in the seismic data volume. The process will be described here in terms of vertical cross sections for specificity, although the invention is not limited to this. Other two-dimensional arrays, such as horizontal cross sections, could also be used with simple modifications to the process as described. It is preferable that the selection of cross sections in the seismic data volume be done in a systematic manner, although the invention is not limited to this. Thus, it is preferable that the first of the vertical cross sections be selected at one end of the seismic data volume and that each further vertical cross section be selected in sequential order along the volume in the direction for which the calculations are being performed (in other words, the first direction or the second direction of FIG. 1).

At step 203, a one-dimensional array is selected within the two-dimensional array selected in step 202. The process will be described here in terms of horizontal rows in vertical cross sections for specificity, although the invention is not limited to this. Other one-dimensional arrays, such as vertical columns, could be used with simple modifications to the process as described. It is preferable that the selection of horizontal rows in the cross section be done in a systematic manner, although the invention is not limited to this. Thus, it is preferable that the first of the horizontal rows be selected at the top or bottom of the cross section and that each further horizontal row be selected in sequential order down or up, respectively, in the cross section.

At step 204, a first data location is selected within the horizontal row selected in step 203. It is preferable that the selection of first data locations in the horizontal row be done in a systematic manner. Thus, it is preferable that the initial first data location be selected at one end of the horizontal row and that each further data location be selected in sequential order along the row.

At step 205, a second data location is selected separated in the selected direction from the first data location selected in step 204 by the horizontal length scale selected in step 201. At step 206, the data value at the second data location selected in step 205 is subtracted from the data value at the first data location selected in step 204.

If the pixel $S_{I,j,k}$ represents the seismic data value of the pixel at the first data location (I,j,k) then $S_{I+\Delta I,j,k}$ represents the data value of the pixel at the second data location (I+ΔI,j,k) displaced a distance of ΔI pixels in the horizontal selected direction. ΔI then corresponds to the horizontal length scale selected in step 201, and the selected horizontal direction corresponds to the first direction, selected in step 102 of FIG. 1. Then the horizontal gradient dx in the selected direction is preferably calculated in step 103 of FIG. 1 using the equation $$dx = S_{i,j,k} - S_{i+\Delta i,j,k} \quad (11)$$

Similarly, let $S_{I,j+\Delta j,k}$ represent the data value of the pixel at a data location (I,j+Δj,k) displaced horizontally a distance of Δj pixels in the second direction from the first data location. Here, Δj corresponds to the horizontal length scale selected in step 201, and the selected horizontal direction corresponds to the second direction, selected in step 108 of FIG. 1. Then, the horizontal gradient dy in the second direction would preferably be calculated in step 109 of FIG. 1 using the equation $$dy = S_{i,j,k} - S_{i,j+\Delta j,k} \quad (12)$$

At step 207, a third data location is selected separated in the vertical direction from the first data location selected in step 204 by the vertical length scale selected in step 201. At step 208, the data value at the third data location selected in step 207 is subtracted from the data value at the first data location selected in step 204. Let $S_{I,j,k+\Delta k}$ represent the data value of the pixel at the third data location (I,j,k+Δk) displaced vertically a distance of Δk pixels in the third direction. Here, Δk corresponds to the vertical length scale selected in step 201. Thus, the vertical gradient dz is preferably calculated in steps 104 and 110 of FIG. 1 using the equation $$dz = S_{i,j,k} - S_{i,j,k+\Delta k} \quad (13)$$

The difference operators in gradient Equations (11), (12), and (13) can be optionally tapered to minimize any noise inherent in an area with poor quality data. These difference operators are preferably tapered with a cosine function. As will be understood to one skilled in the art, any such tapering function would be applied by centering the function on the data locations used in calculating the difference operators, and applying the tapering amplitudes to the data locations prior to calculating the difference operator.

At step 209, it is determined whether sufficient data locations have been selected in the horizontal row selected in step 203. In a preferred embodiment, all data locations in the horizontal row are selected as first data locations. In an alternative embodiment, a plurality of data locations sufficient to provide a pre-specified desired level of coverage of the horizontal row are selected. If the answer to the question in step 209 is no, then the process returns to step 204 to select another data location. Steps 204 through 209 are repeated until all desired data locations in the horizontal row have been selected. Then the answer to the question in step 209 is yes and the process continues to step 210.

At step 210, it is determined whether sufficient horizontal rows have been selected in the vertical cross section selected in step 202. In a preferred embodiment, all horizontal rows in the vertical cross section are selected. In an alternative embodiment, a plurality of horizontal rows sufficient to provide desired coverage of the vertical cross section are selected. If the answer to the question in step 210 is no, then the process returns to step 203 to select another horizontal row. Steps 203 through 210 are repeated until all desired horizontal rows in the vertical cross section have been selected. Then the answer to the question in step 210 is yes and the process continues to step 211.

At step 211, it is determined whether all vertical cross sections in the seismic data volume have been selected. In a preferred embodiment, all vertical cross sections in the seismic data volume are selected. In an alternative embodiment, a plurality of vertical cross sections sufficient to provide desired coverage of the seismic data volume are selected. If the answer to the question in step 211 is no, then the process returns to step 202 to select another vertical cross section. Steps 202 through 211 are repeated until all desired vertical cross sections in the seismic data volume have been selected. Then the answer to the question in step 211 is yes and the process ends at step 212. The entire process of FIG. 2 may then be applied to the second horizontal direction of the method described in association with FIG. 1, and thereafter to the vertical direction.

The method of the invention is capable of calculating and extracting seismic geometries on a single line (apparent dips) or throughout a 3-D volume (apparent dips, true dips, and azimuths). The ability to transform standard seismic amplitude or attribute volumes into seismic geometry volumes will result in significant time reduction, improved accuracy, and reproducibility for seismic interpretation.

Seismic geometry-attribute volumes are used for general analysis of reservoir geometry and continuity, to provide dip-steering of textural attribute calculations in seismic facies analysis, and to condition geologic models for use in development planning and reservoir management. In particular, since seismic geometry is often a large component of the data considered in seismic facies analysis, the method of the invention can significantly improve the efficiency and accuracy of seismic facies mapping efforts. Applications investigating the usefulness of the method in conjunction with the analysis of a regional hydrocarbon system and the study of fault seal potential have also been performed.

It should be understood that the preceding is merely a detailed description of specific embodiments of this invention and that numerous changes, modifications, and alternatives to the disclosed embodiments can be made in accordance with the disclosure herein without departing from the scope of the invention. The preceding description, therefore, is not meant to limit the scope of the invention. Rather the scope of the invention is to be determined only by the appended claims and their equivalents.

What is claimed is:

1. A method of analyzing dip in a seismic data volume, comprising:
   (a) obtaining a seismic data volume consisting of seismic data as a function of spatial location in a three-dimensional subsurface region, said seismic data being seismic amplitude values or seismic attributes derived from the seismic amplitudes;
   (b) selecting a first direction in the seismic data volume;
   (c) calculating a horizontal gradient of the seismic data in the first direction at a plurality of data locations in the seismic data volume;
   (d) calculating a vertical gradient of the seismic data at a plurality of data locations in the seismic data volume; and
   (e) calculating a dip in the first direction from the horizontal gradient in the first direction and the vertical gradient, to thereby create a first dip volume.

2. The method of claim 1, further comprising:
   selecting a second direction in the seismic data volume;
   calculating a horizontal gradient of the seismic data in the second direction at a plurality of data locations in the seismic data volume; and
   calculating a dip in the second direction from the horizontal gradient in the second direction and the vertical gradient to thereby create a second dip volume.

3. The method of claim 1, wherein the steps of calculating the gradients comprise:
   (a) selecting a length scale;
   (b) selecting a cross section in the seismic data volume for which a gradient is desired;
   (c) selecting a row within the cross section;
   (d) subtracting a data value in the row from a second value in the row, where the locations of the data values are separated by the length scale, to generate the gradient between the data values;
   (e) repeating step (d) for a plurality of data locations in the row;
   (f) repeating steps (d) through (e) for a plurality of rows in the cross section; and
   (g) repeating steps (d) through (f) for a plurality of cross sections in the seismic data volume.

4. The method of claim 1, wherein the dip in the first direction is calculated using the equation $$\theta_x = \tan^{-1}\left(\frac{dz}{dx}\right),$$

where $\theta_x$ is the dip in the first direction, dz is the vertical gradient and dx is the horizontal gradient in the first direction.

5. The method of claim 2, further comprising:
   calculating an azimuth relative to the first direction from the dip in the first direction and the dip in the second direction to generate an azimuth volume.

6. The method of claim 2, further comprising:
   calculating an azimuth relative to the second direction from the dip in the second direction and the dip in the first direction at the data location to generate a second azimuth volume 7. The method of claim 2, wherein the dip in the second direction is calculated using the equation $$\theta_y = \tan^{-1}\left(\frac{dz}{dy}\right),$$

where $\theta_y$ is the dip in the second direction, dz is the vertical gradient and dy is the horizontal gradient in the second direction.

8. The method of claim 2, wherein the gradient calculations are modified by a tapering operator to attenuate noise.

9. The method of claim 2, comprising the further step of:
   applying a median filter to the calculated dip values to attenuate noise.

10. The method of claim 5, further comprising:
    calculating a true dip for the seismic data volume from the dip in the second direction and the azimuth relative to the first direction to generate a true dip volume.

11. The method of claim 6, further comprising:
    calculating a true dip for the seismic data volume from the dip in the first direction and the azimuth relative to the second direction at the data location to generate a second true dip volume.

12. The method of claim 6, wherein the azimuth relative to the second direction is given by the following equation $$\beta_y = \cot^{-1}\left(\frac{\tan(\theta_x)}{\tan(\theta_y)\sin(\phi)} - \cot(\phi)\right),$$

where $\beta_y$ is the azimuth in the second direction, $\theta_x$ is the dip in the first direction, $\theta_y$ is the dip in the second direction, and $\phi$ is the angle between the first and second directions.

13. The method of claim 11, wherein the true dip is calculated using the equation $$\text{true dip} = \tan^{-1}\left(\frac{\tan(\theta_y)}{\sin(\beta_x)}\right),$$

where $\theta_x$ is the dip in the first direction and $\beta_y$ is the azimuth relative to the second direction.

14. The method of claim 6, wherein the first and second directions are substantially orthogonal and a true dip is calculated using the equation $$\text{true dip} = \tan^{-1}\left(\frac{\tan(\theta_y)}{\cos(\beta_y)}\right),$$

where $\theta_y$ is the dip in the second direction and $\beta_y$ is the azimuth relative to the second direction.

15. The method of claim 9, wherein the median filter is a 9×9 median filter.

16. The method of claim 5, wherein the azimuth relative to the first direction is given by the following equation $$\beta_x = \cot^{-1}\left(\frac{\tan(\theta_y)}{\tan(\theta_x)\sin(\phi)} - \cot(\phi)\right),$$

where $\beta_x$ is the azimuth in the first direction, $\theta_y$ is the dip in the second direction, $\theta_x$ is the dip in the first direction, and $\phi$ is the angle between the first and second directions.

17. The method of claim 10, wherein the true dip is calculated using the equation $$\text{true dip} = \tan^{-1}\left(\frac{\tan(\theta_x)}{\sin(\beta_y)}\right),$$

where $\theta_y$ is the dip in the second direction and $\beta_x$ is the azimuth relative to the first direction.

18. The method of claim 5, wherein the first and second directions are substantially orthogonal and a true dip is calculated using the equation $$\text{true dip} = \tan^{-1}\left(\frac{\tan(\theta_x)}{\cos(\beta_x)}\right),$$

where $\theta_x$ is the dip in the first direction and $\beta_x$ is the azimuth relative to the first direction.

* * * * *